United States Patent Office 2,921,040
Patented Jan. 12, 1960

2,921,040

EPOXIDE RESIN COMPOSITION

Clayton A. May, Oakland, Calif., assignor to Shell Development Company, Emeryville, Calif., a corporation of Delaware No Drawing. Application October 8, 1953
Serial No. 385,031

4 Claims. (Cl. 260—18)

This invention relates to an epoxide resin composition.

When epoxide resins which are glycidyl polyethers of polyhydric phenols have a curing agent mixed therewith and are subjected to curing conditions as by heating, the resulting resinified product is quite brittle. This brittleness is a disadvantageous property of the products in many applications such as use of the products for protective surface coatings, pottings for electrical apparatus and the like. I have now discovered that by incorporating a special type of ester with the epoxide resin, a flexible resilient product is obtained after cure of the new composition.

The composition of the invention comprises a mixture of (1) a glycidyl polyether of a polyhydric phenol having a 1,2-epoxy equivalency greater than 1.0, and (2) a polyester of a polyhydric alcohol and a hydroxy fatty acid of 12 to 22 carbon atoms. The composition after cure is much more flexible than the product after corresponding cure from the glycidyl polyether alone without having present the polyester. In the composition, the polyester is preferably castor oil.

Unlike plasticizers or flexibilizing agents in general, the hydroxy fatty acid ester employed in my composition with the glycidyl polyethers appears to react with the glycidyl polyether during cure and be chemically bound in the cured product because upon subjecting the product in finely divided condition to extraction with very active hot solvents such as lower ketones, no substantial removal of the polyester from the cured product occurs. The fact that the hydroxy ester is chemically bound in the cured product is an important feature of the invention. Conventional plasticizers contained in resins tend to evaporate, bleed or otherwise migrate from the resin with the result that needed flexibility is decreased and lost in due course of time. This fault is overcome with the cured products of the present invention by having the flexibilizing hydroxy fatty acid ester chemically bound in the cured product.

The glycidyl polyethers of polyhydric phenols contained in the composition are obtained by reacting a polyhydric phenol with a molar excess of epichlorhydrin or glycerol dichlorhydrin and sufficient sodium or potassium hydroxide to combine with the reacted chlorine. In preparing the glycidyl polyether from polyhydric phenols containing three or more phenolic hydroxyl groups as well as in preparing glycidyl polyethers of lowest molecular weight from dihydric phenols, there is used a substantial excess of the chlorhydrin such as about 3 to 20 mols of chlorhydrin per phenolic hydroxyl equivalent of the phenol. By using such a substantial excess of chlorhydrin, the product formed is a glycidyl polyether wherein most all of the phenolic hydroxyl groups of the polyhydric phenol have been replaced with glycidyloxy groups. A small proportion of the phenolic hydroxyl groups are replaced with 2,3-dihydroxypropyl-oxy radicals and/or 3-chloro-2-hydroxypropyloxy radicals.

With the dihydric phenols, the molecular weight and complexity of the glycidyl polyether can be varied by changing the proportion of epichlorhydrin or dichlorhydrin to phenol. By using more than one up to about two mols of the chlorhydrin per mol of the phenol, there is obtained a glycidyl polyether whose principal constituent may be represented by the formula

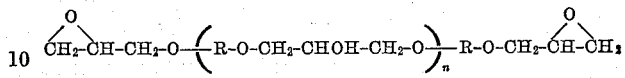

wherein R is the divalent aromatic hydrocarbon (which was linked directly to the two hydroxyl groups of the starting phenol) and $n$ is an integer. The glycidyl polyether also contains a small proportion of compounds of similar structure wherein one or both of the glycidyl groups are substituted with 2,3-dihydroxypropyl radicals and/or 3-chloro-2-hydroxypropyl radicals. The glycidyl polyether is thus seen to have a chain of alternating glyceryl radicals and divalent hydrocarbon radicals united by ether oxygen with glyceryl radicals in terminal position and these terminal glyceryl radicals are predominantly glycidyl groups. By decreasing the molar ratio of chlorhydrin to phenol from 2/1 downwards toward 1/1, the molecular weight and value of $n$ increases. Furthermore, the value of $n$ equals or approaches zero with use of a substantial molar excess of chlorhydrin.

When the glycidyl polyethers are formed with use of a substantial excess of epichlorhydrin or the dichlorhydrin, the polyhydric phenol is dissolved in the chlorhydrin and the sodium or potassium hydroxide is added while heating the mixture at about 50° C. to 150° C. The heating is continued for a short time after all the base has been added in order to complete the reaction. The unreacted chlorhydrin is next distilled from the reaction mixture and a solvent for the polyether, but a non-solvent for the salt, is added. The precipitated salt is removed by filtration and the added solvent separated by distillation to leave the desired glycidyl polyether.

In using 2 or less mols of chlorhydrin per mol of dihydric phenol, the base in stoichiometric proportion or small excess is first added to the dihydric phenol and then the chlorhydrin is mixed in while heating at 50° C. to 150° C. for several hours. The formed salt is usually removed by washing the product while molten with hot water.

Glycidyl polyethers of any of the various polyhydric phenols are used in the composition of the invention, including, for example, resorcinol, hydroquinone, methyl resorcinol, phloroglucinol, 1,5 - dihydroxynaphthalene, 4,4' - dihydroxydiphenyl, bis(4 - hydroxyphenyl)methane, 1,1 - bis(4 - hydroxyphenyl)ethane, 2,2 - bis(4-hydroxyphenyl)propane which is termed bis-phenol hereinafter for convenience, 2,2 - bis(4 - hydroxy - 2 - methylphenyl)pentane, 2,2 - bis(2 - hydroxyphenyl)propane, 2,2 - bis(2 - hydroxynaphthyl)butane, 4,4' - dihydroxybenzophenone, 2,2 - bis(2,5 - dichloro - 4 - hydroxyphenyl)propane, as well as more complex polyhydric phenols such as novolac resins obtainable by acid catalyzed condensation of phenol, p-cresol or other substituted phenols with aldehydes such as formaldehyde, acetaldehyde, croton aldehyde, benzaldehyde, etc.

The glycidyl polyethers of polyhydric phenols employed in the composition of the invention have a 1,2-epoxy equivalency greater than 1.0. By the 1,2-epoxy equivalency, reference is made to the number of 1,2-epoxy groups contained in an average molecule of the glycidyl polyether. In the case where the glycidyl polyether is derived from a complex polyhydric phenol such as a novolac resin, its 1,2-epoxy equivalency may be 3 or more. With glycidyl polyethers of dihydric phenols, the 1,2-epoxy equivalency is between 1.0 and 2.0 although it usually is about 1.4 to 1.9.

The glycidyl polyethers employed in the composition of the invention will be better understood by considering preparation and properties of several particular substances.

POLYETHER A

A solution is prepared by dissolving 2,2-bis(4-hydroxyphenyl)-propane in slightly aqueous epichlorhydrin in the proportion of 5,130 parts (22.5 mols) of the dihydric phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hyroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to remove exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vaccum distillation with use of a kettle temperature up to 150° C. and a pressure of 50 mm. Hg. After completion of the distillation, the residue is cooled to about 90° C. and about 360 parts of benzene are added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting liquid glycidyl polyether of 2,2-bis(4-hydroxyphenyl)-propane, designated hereinafter as Polyether A, has the following properties:

Durrans' melting point, ° C. _____ 9
Molecular weight _____ 370
Epoxide value (epoxide equivalents per 100 grams) _ 0.48
1,2-epoxy equivalency _____ 1.8
Hydroxyl value (hydroxyl equivalents
 per 100 grams) _____ 0.08
Percent chlorine _____ 0.47

POLYETHER B

In a vessel fitted with an agitator, 228 parts of 2,2-bis(4-hydroxyphenyl)propane and 55 parts of sodium hydroxide as a 10% aqueous solution are introduced and heated to about 45° C., whereupon 113 parts of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The resulting solid glycidyl polyether has the following properties:

Durrans' melting point, ° C. _____ 98
Molecular weight _____ 1400
Epoxide value (equivalents epoxide
 per 100 grams) _____ 0.12
1,2-epoxy equivalency _____ 1.7
Hydroxyl value (equivalents hydroxyl
 per 100 grams) _____ 0.35
Percent chlorine _____ 0.14

It is particularly preferred that the hydroxy fatty acid ester employed as flexibilizing agent in the composition of the invention be castor oil. If desired, however, other polyesters of polyhydric alcohols and hydroxy fatty acids may be used. Reference is made to the polyesters of such representative polyhydric alcohols as ethylene glycol, propylene glycol, diethylene glycol, glycerol, phenylglycerol, methylglycerol, erythritol, pentaerythritol, dipentaerythritol, mannitol, sorbitol, and the like with a hydroxy fatty acid such as ricinoleic acid, 12-hydroxystearic acid, 1-hydroxypalmitic acid, 2-hydroxylauric acid, 2-hydroxymyristic acid, 2-hydroxystearic acid, 13-hydroxytridecanoic acid, 16-hydroxypalmitic acid, 17-hydroxymargaric acid, 20-hydroxyarachidic acid, 9,10-dihydroxypalmitic acid, 6,7-dihydroxybehenic acid, 9,10-dihydroxypalmitic acid, 6,7-dihydroxystearic acid, 12,13-dihydroxystearic acid, 13,14-dihydroxybehenic acid, 9,10,12-trihydroxystearic acid, hexahydroxystearic acid, and the like. The polyesters of the polyhydric alcohols and hydroxy fatty acid can be readily prepared by methods well known in the art. For example, the following method is suitable. The methyl ester of the hydroxy fatty acid is produced first by esterifying the acid with methanol according to the procedure of Swern and Jordan, J. Am. Chem. Soc. 67, 902 (1945). The acetate of the polyhydric alcohol is next prepared in usual fashion by esterifying the alcohol to completion with acetic anhydride. The resulting acetate is then reacted with the methyl ester with formation of the desired hydroxy fatty acid ester and liberation of methyl acetate which is removed by distillation in accordance with the method of Konen et al., Oil and Soap 22, 57 (1945). It is desirable that the polyester of the polyhydric alcohol and the hydroxy fatty acid be substantially completely esterified.

While the polyester may be a derivative of a single polyhydric alcohol and a single hydroxy fatty acid ester, it may also be a derivative of two or more alcohols and/or two or more hydroxy acids. If desired, the polyester may also contain a minor proportion of acyl groups therein which are from unsubstituted saturated or unsaturated fatty acids such as lauric acid, stearic acid, oleic acid, and/or linoleic acid, as is the case, for example, with castor oil.

Various modifications of the hydroxy fatty acid esters are also suitable as flexibilizers for use in the compositions. It is only necessary that a part or fraction of the hydroxyl groups linked directly to the acyl groups of the polyester remain free and unmodified. Thus there may be used hydroxy fatty acid esters which have part of the hydroxyl groups esterified with a monocarboxylic acid such as is the case, for example, with partially acetylated castor oil. It is preferred that only up to about 85% of the alcoholic hydroxyl groups be esterified. Also suitable are hydroxy fatty acid esters which have been modified by air blowing at about 80° C. to 130° C. such as well known blown castor oil. Another suitably modified product is partially or completely hydrogenated castor oil.

The compositions of the invention are prepared by blending the hydroxy fatty acid polyester with the glycidyl polyether. For this purpose, it is preferred that both ingredients, rather than only one, be in liquid or molten condition when they are mixed together. It is desirable that the glycidyl polyether be in molten condition and that liquid hydroxy fatty acid polyester be added thereto with agitation so as to obtain a homogeneous mixture. The use of heat in blending the ingredients is helpful with the temperature of the mixture being about 20 to 100 degrees centigrade above the melting or softening point of the highest melting component. Thus in mixing castor oil with Polyether A, it is preferred to effect the blending with the mixture at a temperature of about 65° C. Especially with the higher melting glycidyl polyethers, it is convenient to mix and blend the ingredients on a heated roll mill. If desired, the components may be blended together in solvents. This procedure is particularly useful when the composition is to be used for surface coating purposes. Various volatile organic solvents are suitable for this purpose including acetone, methyl ethyl ketone, methyl isobutyl ketone, diacetone alcohol, ethyl acetate, monomethyl ether of ethylene glycol and its acetate, and chloroform.

It is preferred that the compositions be a mixture of glycidyl polyether and a minor proportion of hydroxy fatty acid polyester although the polyester may be present in a major proportion if desired. The compositions contain a substantial or appreciable proportion of each component. In general, the compositions comprise the glycidyl polyether and about an added 5% to 80% by weight of the polyester, preferably about an added 10% to 40% by weight of the polyester. Very desirable compositions comprise a glycidyl polyether of 2,2-bis(4-hydroxyphenyl)propane having a 1,2-epoxy equivalency between about 1.7 and 2.0, and containing 1 to 1.5 2,2-bis(4-phenylene)propane radicals in the average molecule thereof, which has admixed therewith about an added 10% to 40% by weight of castor oil, air blown castor oil or partially acetylated castor oil.

The compositions of the invention are resinified to useful products for application in sealing and embedding component parts of electrical apparatus, for insulating electric wire and parts, for protective surface films, for adhesive purposes, and for laminating sheets of other materials. The resinification is effected by adding and mixing into the compositions one or more epoxide resin curing or hardening agents.

Upon the addition of the hardening agent, the composition begins to cure and harden even at ordinary temperature. Elevated temperatures such as from about 50° C to 200° C. may be used to effect the resinification if desired. A great variety of substances are now known to be hardening agents for the resin-forming ingredients of the composition such as alkalies like sodium or potassium hydroxide; alkali phenoxides like sodium phenoxides; carboxylic acids or anhydrides such as formic acid, oxalic acid, or phthalic anhydride; Friedel-Crafts metal halides like aluminum chloride, zinc chloride, ferric chloride, or boron trifluoride, as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, pyridine, piperidine, N,N-diethyl-1,3-propanediamine, dicyandiamide, melamine, and the like, as well as carboxylic acid salts of the amines. The hardening agent is added and mixed in with the composition in order to effect hardening. The amounts vary considerably depending upon the particular agent employed. For the alkalies or phenoxides, 2 to 4 percent, based upon the weight of glycidyl polyether, is suitable. With phosphonic acid and esters thereof, good results are obtained with 1 to 10 percent added. The amino compounds are used in amounts of about 5 to 15 percent and the others involve addition of about 1 to 20 percent, both ranges being based upon the amount of glycidyl polyether present.

Various optional ingredients may be contained in the compositions of the invention such as other resins, dyes, organic and inorganic fillers and the like.

The following examples illustrate the invention, but they are not to be construed as limiting its scope to details described therein. The parts and percentages are by weight.

Example 1

A mixture was prepared containing 64.3 parts of Polyether A, 35.7 parts of refined castor oil, and 3.2 parts of piperidine. The castor oil had an acetyl value of 150. The mixture was cured by placing in an oven regulated to a temperature of 65° C. for a period of 30 hours. The resulting resinous product was a tough pliable material at room temperature.

In contrast to this product, the resinous material obtained by curing Polyether A alone with a like proportion of piperidine under corresponding conditions was hard and brittle.

Example 2

Mixed compositions were prepared containing 15, 35.7 and 60% of refined castor oil, the balance being Polyether A. There was then stirred into the mixtures, an added 5% of piperidine based upon the amount of polyether. The mixtures were cured by heating in an oven regulated to 65° C. for about 28 hours. Each of the resulting resinous products were homogeneous, tough and pliable with the cured mixtures containing the greater proportions of oil being more flexible.

For comparison, mixtures were prepared using Polyether A containing duplicate proportions of soybean oil, a typical vegetable oil that contains no hydroxyl groups linked to the acyl radicals thereof. The mixtures were heated with the same proportions of curing agent as above in the oven set at 65° C. for a like time. However, instead of obtaining the tough flexible products as with castor oil, the products were of no value because the oil separated to give a liquid top layer and a hard resinous bottom layer from the cured polyether.

Example 3

Unlike other plasticizers, the castor oil is chemically bound in the cured product, probably by reaction of the epoxy groups of the glycidyl polyether with hydroxyl groups of the ricinoleic acid part of the oil. This fact is evident from the results of the following experiment.

A mixture was prepared containing 35 parts of refined castor oil, 65 parts of Polyether A and 3.25 parts of piperidine. Another mixture was prepared containing 100 parts of Polyether A and 5 parts of piperidine. The two mixtures were resinified by heating in an oven set at 65° C. for 22 hours. The resinous products were next cut and ground to a very finely divided form. The powders were then subjected to extraction with boiling methyl ethyl ketone for 36 hours. It was found that 8.8% of material was extracted from the resinous product containing the castor oil, and that 6.5% was extracted from the resin devoid of the oil. If the castor oil had not been chemically bound in the resin, a much larger percentage of material would have been extracted by the ketone.

Example 4

An amine salt was used as curing agent for the composition of the invention. A mixture was prepared containing 65 parts of Polyether A and 35 parts of refined castor oil, and to the mixture was added 6.64 parts of the neutral salt obtained by mixing 3 mols of 2-ethylhexoic acid with a mol of 2,4,6-tri(dimethylaminomethyl)-phenol. The mixture was cured by heating in an oven regulated at 65° C. for 26 hours. Again the resulting product was a tough pliable resin at room temperature of about 25° C.

Example 5

Partially acetylated castor oil was used as a substitute for unmodified castor oil. Two samples of acetylated oil were used, one being acetylated 51.5% and the other 79% of the theoretical. Mixtures were prepared containing 65 parts of Polyether A, 35 parts of the acetylated oil and 3.25 parts of piperidine. The mixtures were cured in an oven set at 65° C. for 22 hours. Each of the two resinous products was a tough flexible resin.

Example 6

Blown castor oil having an acid value of 26.0 was substituted for unmodified oil. A mixture was prepared containing 100 parts of Polyether A, 54 parts of the air blown oil and 5 parts of piperidine. The mixture was cured by heating in an oven set at 65° C. for 24 hours. The resulting resinous product was also tough and pliable.

I claim as my invention:

1. A hard cured product obtained by reacting a mixture comprising (1) glycidyl polyether of 2,2-bis(4-hydroxyphenyl)propane having a 1,2-epoxy equivalency of about 1.8, (2) a substantial proportion of a member of the group consisting of (a) castor oil, (b) air blown castor oil, and (c) castor oil which has been acetylated to the extent of 51.5% to 79% of the theoretical, and (3) an amine epoxy curing agent.

2. A hard cured product obtained by heating and reacting a mixture made up of 65% by weight of glycidyl polyether of 2,2-bis(4-hydroxyphenyl)propane having a 1,2-epoxy equivalency of about 1.8 and 35% by weight of castor oil which has been acetylated to the extent of 51.5% to 79% of the theoretical, with an amine epoxy curing agent.

3. A hard cured product obtained by heating and reacting a mixture made up of 85% to 40% by weight of glycidyl polyether 2,2-bis(4-hydroxyphenyl)propane having a 1,2-epoxy equivalency of about 1.8 and 15% to 60% by weight of castor oil, with an amine epoxy curing agent.

4. A hard cured product obtained by heating and reacting a mixture comprising 65% by weight of glycidyl polyether of 2,2-bis(4-hydroxyphenyl)propane having a 1,2-epoxy equivalency of about 1.8 and 35% by weight of air blown castor oil, with an amine epoxy curing agent.

References Cited in the file of this patent

UNITED STATES PATENTS

| Number | Name | Date |
|---|---|---|
| 2,456,408 | Greenlee | Dec. 14, 1948 |
| 2,592,560 | Greenlee | Apr. 15, 1952 |
| 2,652,376 | Rinse | Sept. 15, 1953 |
| 2,684,345 | Yuska et al. | July 20, 1954 |
| 2,691,004 | Doyle | Oct. 5, 1954 |
| 2,712,535 | Fisch | July 5, 1955 |
| 2,731,444 | Greenlee | Jan. 17, 1956 |
| 2,788,335 | Barthel | Apr. 9, 1957 |
| 2,794,007 | Taylor | May 28, 1957 |
| 2,803,609 | Schlenker | Aug. 20, 1957 |

FOREIGN PATENTS

| Number | Country | Date |
|---|---|---|
| 141,807 | Australia | June 26, 1951 |
| 675,167 | Great Britain | July 9, 1952 |

OTHER REFERENCES

"Epon Surface Coating Resins," Shell Chemical Corp., SC: 48-9.